April 4, 1961
R. L. LICH
2,977,897
RAILWAY VEHICLE TRUCK STRUCTURE
Filed Aug. 31, 1956
5 Sheets-Sheet 1
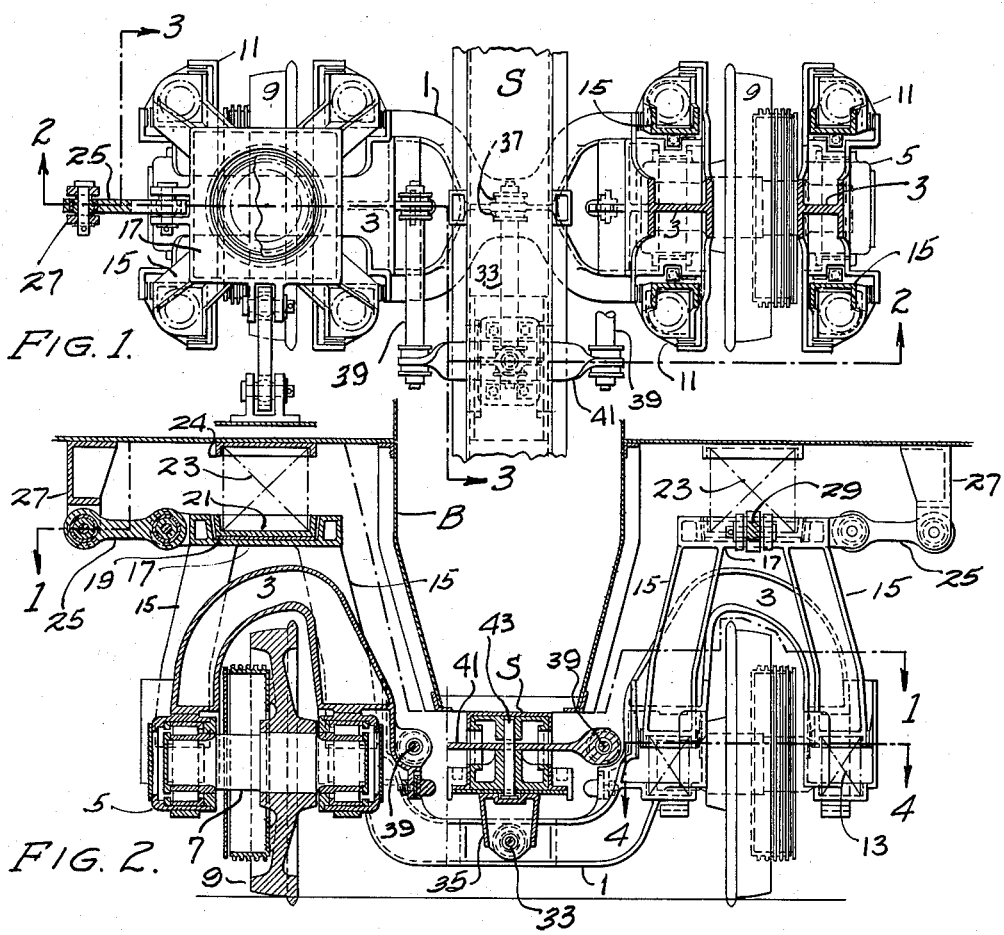
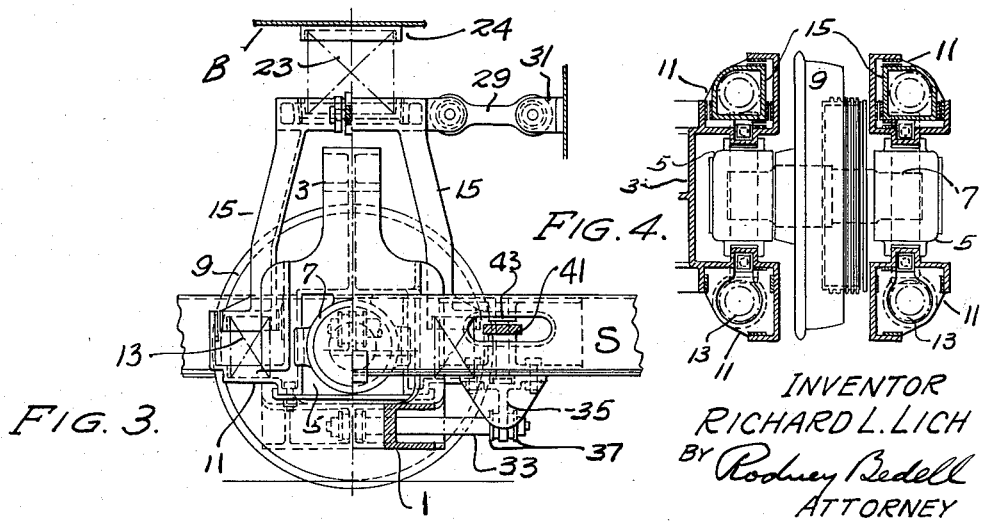
INVENTOR
RICHARD L. LICH
BY Rodney Bedell
ATTORNEY

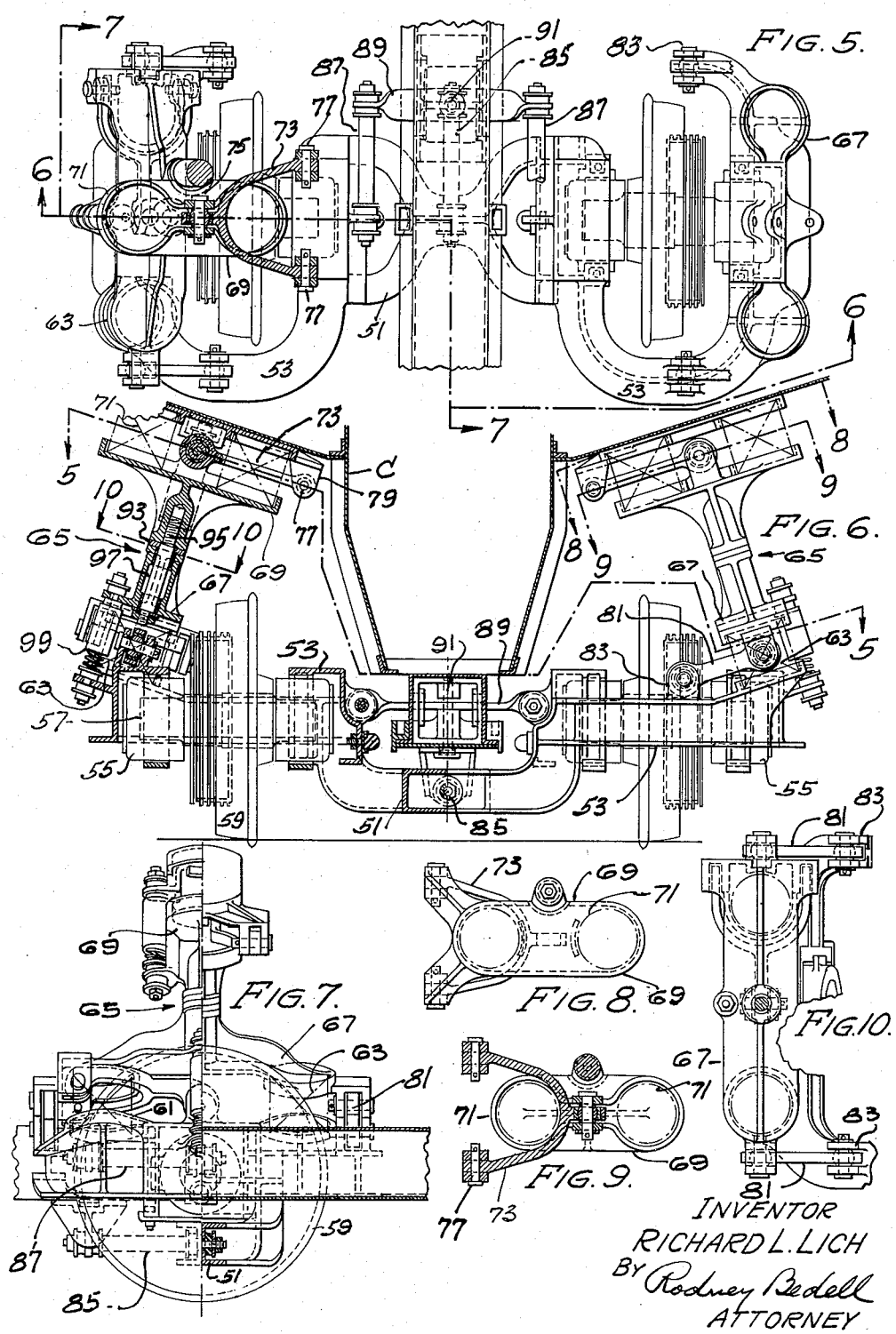

April 4, 1961     R. L. LICH     2,977,897
RAILWAY VEHICLE TRUCK STRUCTURE
Filed Aug. 31, 1956     5 Sheets-Sheet 3

INVENTOR
RICHARD L. LICH
BY Rodney Bedell
ATTORNEY

April 4, 1961 R. L. LICH 2,977,897
RAILWAY VEHICLE TRUCK STRUCTURE
Filed Aug. 31, 1956 5 Sheets-Sheet 4

INVENTOR
RICHARD L. LICH
BY Rodney Bedell
ATTORNEY

April 4, 1961 R. L. LICH 2,977,897
RAILWAY VEHICLE TRUCK STRUCTURE
Filed Aug. 31, 1956 5 Sheets-Sheet 5
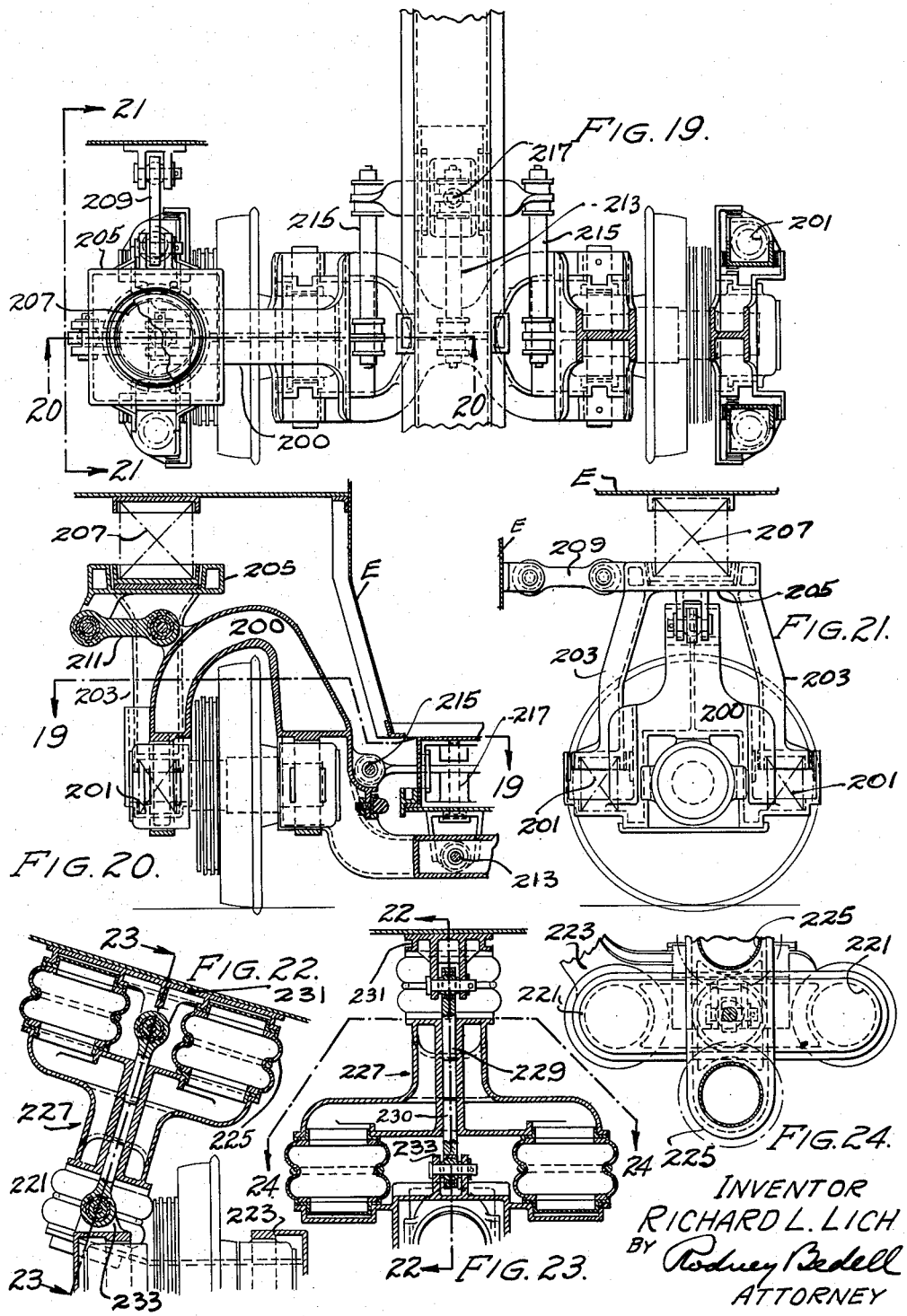
INVENTOR
RICHARD L. LICH
BY Rodney Bedell
ATTORNEY

United States Patent Office 2,977,897
Patented Apr. 4, 1961

2,977,897

RAILWAY VEHICLE TRUCK STRUCTURE

Richard L. Lich, Ferguson, Mo., assignor to General Steel Castings Corporation, Granite City, Ill., a corporation of Delaware Filed Aug. 31, 1956, Ser. No. 607,343

16 Claims. (Cl. 105—180)

The invention relates to railway rolling stock and particularly to truck structure and to the mounting of a vehicle body upon the truck structure. The invention comprises the provision of upright struts at the sides of the truck each mounted at its lower end on a portion of the truck frame and supporting the vehicle body on its upper end. One or both ends of the strut are provided with springs for supporting the strut on the truck frame or supporting the body on the strut or both. Elongated members extend lengthwise and crosswise of the truck and are connected to the struts and associated parts to control tilting of the struts and other relative movements of the truck structure and the body.

The main objects of the invention are to lighten truck structure, to improve riding characteristics by better control of lateral motion of the body relative to the truck and of the swiveling of the truck relative to the body and to increase the lateral stability of the body.

The general objects and other detail objects are attained by the structures illustrated in the accompanying drawings, in which:

Figure 1 is in part a top view and in part a horizontal section of a two-wheel truck and an adjacent portion of a vehicle body embodying one form of the invention. The figure is taken approximately on line 1—1 of Figure 2.

Figure 2 is a vertical transverse section and elevation on line 2—2 of Figure 1.

Figure 3 is a side elevation and longitudinal section on line 3—3 of Figure 1.

Figure 4 is a horizontal section on line 4—4 of Figure 2.

Figure 5 corresponds to Figure 1, but illustrates a second form of the invention, and is taken on line 5—5 of Figure 6.

Figure 6 corresponds to Figure 2, and is taken on line 6—6 of Figure 5.

Figure 7 corresponds to Figure 3, and is taken on line 7—7 of Figure 5.

Figure 8 is a detail top view of a spring cap and associated parts, and is taken on line 8—8 of Figure 6.

Figure 9 is a substantially horizontal section on line 9—9 of Figure 6.

Figure 10 is a substantially horizontal section on line 10—10 of Figure 6.

Figure 11:
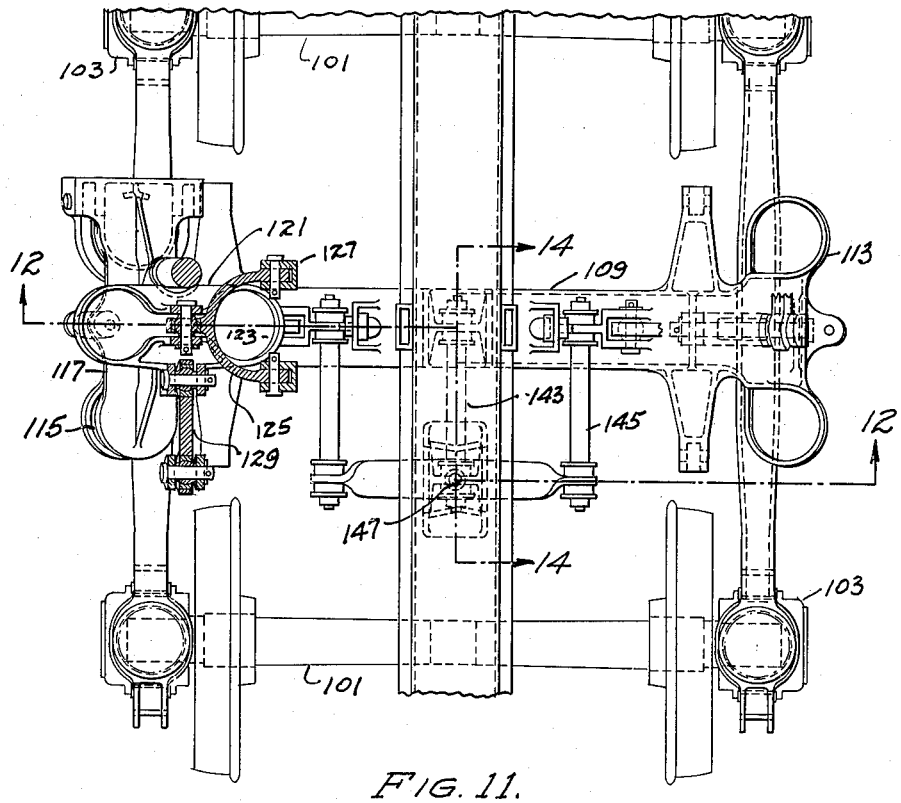
Figure 12:
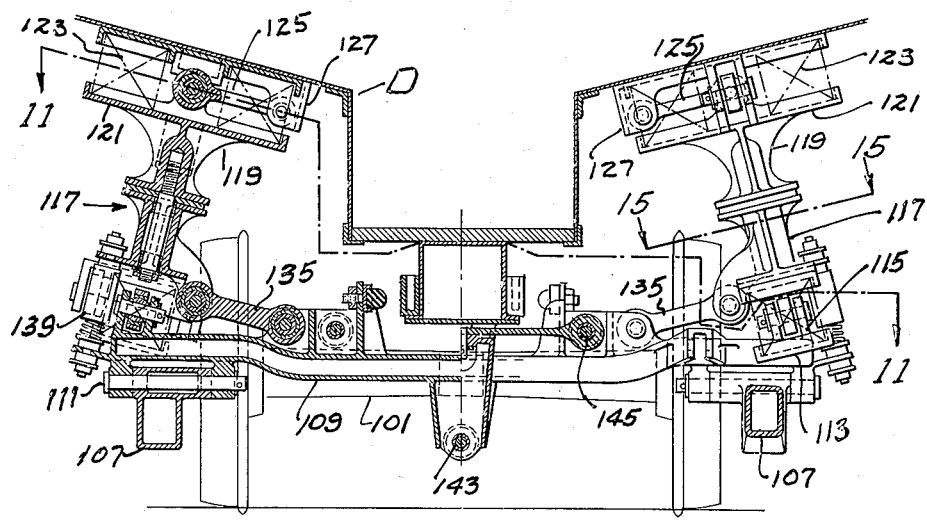

Figure 11 corresponds generally to Figures 1 and 5, but illustrates a third form of the invention embodied in a four-wheel truck, and is taken on line 11—11 of Figure 12.

Figure 12 corresponds to Figures 2 and 6, and is taken on line 12—12 of Figure 11.

Figure 13:
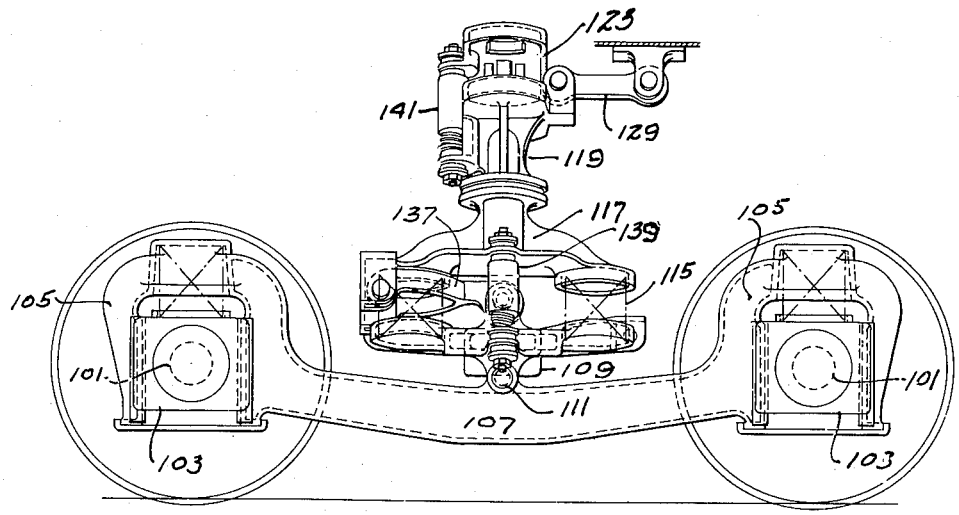

Figure 13 is a side view of the truck shown in Figures 11 and 12.

Figure 14:
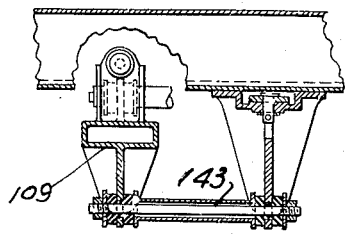

Figure 14 is a detail vertical longitudinal section on line 14—14 of Figure 11.

Figure 15:
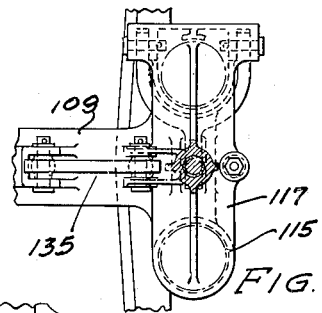

Figure 15 is a detail substantially horizontal section on line 15—15 of Figure 12.

Figures 16, 17:
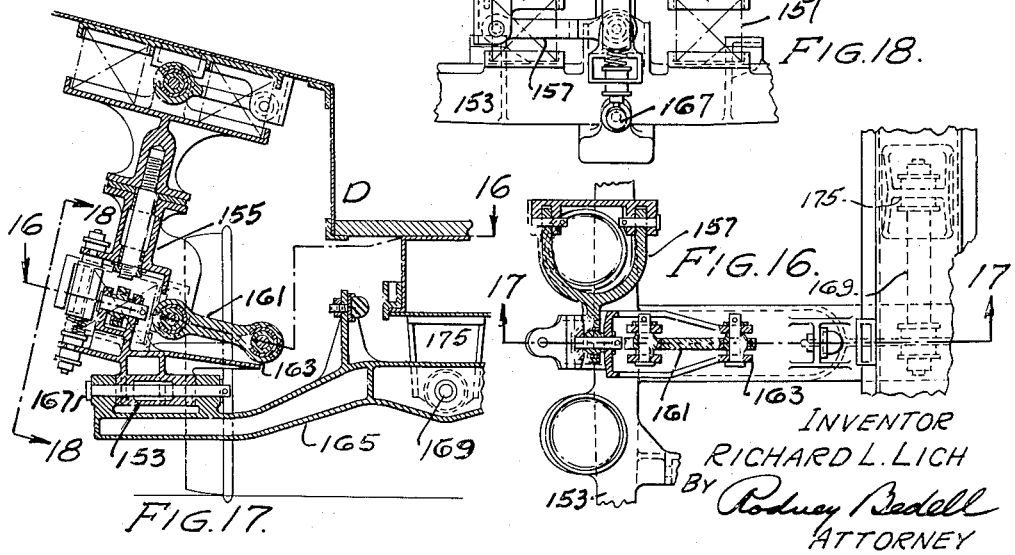

Figure 16 is a substantially horizontal section on line 16—16 of Figure 17, and illustrates a fourth form of the invention embodied in a four-wheel truck.

Figure 17 is a vertical transverse section on line 17—17 of Figure 16.

Figure 18:
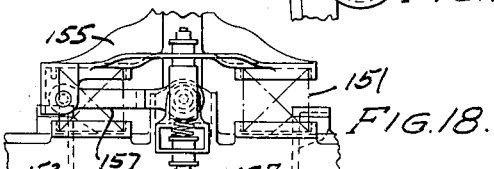

Figure 18 is a detail side elevation taken on line 18—18 of Figure 17.

Figure 19 corresponds to Figures 1 and 5 and illustrates a fifth form of the invention embodied in a two-wheel truck. The figure is taken on line 19—19 of Figure 20.

Figure 20 corresponds to Figures 2 and 6 and is taken on line 20—20 of Figure 19.

Figure 21 corresponds to Figures 3 and 7 and is taken on line 21—21 of Figure 19.

Figure 22 corresponds to the left hand side of Figures 2 and 6 and illustrates a sixth form of the invention. It is taken on line 22—22 of Figure 23.

Figure 23 is a detail vertical section on line 23—23 of Figure 22.

Figure 24 is a top view and horizontal section on line 24—24 of Figure 23.

In the first form of the invention (Figures 1–4) a rigid truck frame extends from side to side of the truck with a low level intermediate portion 1 and inverted U-shape end portions 3, each leg of which is seated upon a journal box 5 receiving a stub axle 7 mounting a wheel 9. Horizontal spring seats 11 project from the lower ends of the frame portions 3 fore and aft of journal boxes 7. Upright coil springs 13 on seats 11 mount the lower end of a substantially upright strut comprising a yoke-like base having four legs 15 straddling the truck frame end portion 3 and the associated wheel 9 and terminating at their upper ends in a single upwardly facing spring support 17. Preferably, a liner 19 on support 17 mounts a spring seat 21. A relatively large diameter upright spring 23 on seat 21 has a cap 24 carrying the side portion of a vehicle body framing indicated generally at B.

An elongated link 25 extends transversely of the truck and is pivoted at one end to the upper end of the strut and at its other end to a bracket 27 on the car framing. A similar link 29 extending lengthwise of the truck is pivoted at one end to the upper end of the strut and at its other end to a bracket 31 on the car framing. Links 25 and 29 have ball joints at their ends and accommodate the tilting of the strut transversely of its axis and the compression and expansion of spring 23, but prevent relative bodily movement of the upper end of the strut transversely and longitudinally of the vehicle body.

An elongated anchor 33 extending along the longitudinal center line of the truck is secured at one end to the low level portion 1 of the truck frame and at its other end to a bracket 35 depending from the vehicle body framing center sill S. This anchor is of the type commonly used in railway trucks to hold interconnected parts against substantial movement lengthwise of the anchor while accommodating their relative movement transversely of the anchor axis by the yielding of rubber pads 37 clamped between opposing elements on the anchor and an intermediate web on the interconnected part. Similar anchors 39 spaced apart transversely of the truck and at a higher level than anchor 33 are each connected at one end to the truck frame and at the other end are connected by a bar 41 which receives a vertical pivot pin 43 extending through body framing center sill S. These anchors 33, 39 hold the two-wheel truck against tilting in a longitudinal plane because of brake torque reactions or other forces tending to load springs 13 unequally.

When the vehicle enters curved track the wide spacing of springs 13 lengthwise of the truck permits the struts to tilt so as to accommodate the swiveling of the truck and body relative to each other about pin 43. Each liner 19 permits the strut to rotate about its vertical axis and avoids twisting or undue wear of spring seat 21. The truck and body may move relative to each other transversely of the vehicle, due to lateral forces, by the tilting of the strut about its pivotal connections to the vehicle body, but the truck frame will remain level. This will result in unequal stresses on springs 13 spaced transversely of the truck with the result that the springs will tend to restore the truck and frame to their normal position when the lateral force terminates. The unequal loading of longitudinally spaced springs 13 will tend to resist swiveling of the truck on the body and will center the truck to its normal position when the vehicle is again on straight track.

In the second form of the invention (Figures 5-10) the truck frame has a low level intermediate portion 51 terminating in upwardly offset horizontal U-shape portions 53 which receive journal boxes 55 journaling stub axles 57 mounting wheels 59. The outer leg of each frame portion 53 forms upwardly facing seats 61, spaced apart lengthwise of the truck, for upright springs 63.

Each upright strut 65 has a yoke-like base 67 elongated lengthwise of the truck, mounted on adjacent springs 63, and a top part 69 elongated transversely of the truck and forming upwardly facing seats for upright coil springs 71 spaced apart transversely of the truck and affording support for the side of the vehicle body framing C. A V-shaped link 73 has a single pivotal connection 75 to strut spring seat 69. The opposite ends of its diverging legs have spaced pivotal connections 77 to brackets 79 on the car framing. The ends of the strut base 67 are pivotally connected by links 81 to brackets 83 on the truck frame.

At the center of the truck the truck frame is pivotally anchored to the body framing by a central anchor 85 and side anchors 87, a cross bar 89 and a center pin 91, similar to the arrangement previously described.

A distinctive feature of this form of the invention resides in the two part construction of the strut whereby the upper and lower portions swivel upon each other about the strut axis and thereby accommodate swiveling of the truck on the body framing without undue lateral deflection of the widely spaced springs 63 supporting the lower end of the strut and the widely spaced springs 71 supporting the side of the car from the upper end of the strut. The opposing ends of the upper and lower portions of the strut engage an intermediate wear plate 93 and the ends of the strut are held against separation by an internal rod 95 threaded into the upper section and into a sleeve 97 in the lower section which is seated between shoulders engaging its ends.

The wide spacing of springs 63 lengthwise of the truck provides stability to the strut against tilting lengthwise of the truck. The wide spacing of springs 71 transversely of the truck provides stability of the strut against undue tilting in a corresponding direction. A telescoping snubber 99 has its opposite ends secured to the lower portion of the strut and to the truck frame and controls the action of strut supporting springs 63.

In the third form of the invention (Figures 11-15) embodying a four-wheel truck, the spaced wheeled axles 101 are journaled in boxes 103 slidably received in the pedestals 105 of truck frame side members, the intermediate portions 107 of which are connected by a transverse transom and spring plank 109, extending from side to side of the truck, by horizontal pivot pins 111. Each end of spring plank 109 has lateral extensions forming spring seats 113 spaced apart lengthwise of the truck for springs 115, which support the lower yoke-like portion 117 of the strut. The upper portion 119 of the strut forms an elongated spring seat 121 for springs 123 spaced apart transversely of the truck and supporting the car body framing D. The upper and lower portions of the strut have a swivel bearing on each other similar to that previously described, but of larger diameter because of the greater relative movement between the upper and lower strut portions due to the increased angular movement caused by the four wheels. A V-shaped link 125 stabilizes the upper portion of the strut relative to the adjacent car body framing, being connected at its inner end to brackets 127 spaced apart lengthwise of the truck. A single link 129 extends longitudinally of the truck between the upper portion of the strut and the body framing. The strut lower portion is connected to the spring plank by a single link 135 extending transversely of the truck, and by a V-shaped link 137 extending lengthwise of the truck. A snubber 139 connects the end of the spring plank with the strut lower portion 117 and controls the action of the strut supporting springs. A snubber 141 connects the upper portion of the strut with the body framing and controls the action of springs 123. The truck is swiveled to the car body framing by a central anchor 143 and spaced side anchors 145 and a pivot pin 147, as in the structures previously described.

The fourth form of the invention (Figures 16, 17, 18) embodies a four-wheel truck, but the strut supporting springs 151 are seated directly upon the longitudinal member 153 of the truck side frame. The lower yoke-like member 155 of the strut is seated upon springs 151 and is connected by a V-shaped link 157 to a bracket 159 on the truck frame to stabilize the strut against undue tilting. A single transverse link 161 pivotally connects the lower member 155 of the strut to a bracket 163 on the truck side frame and stabilizes the strut against undue tilting on springs 151.

A frame transverse member 165 extends between side frames 153 and is pivoted thereto by elongated bolts 167, permitting member 165 to swivel in a longitudinal vertical plane. A single anchor 169 is connected at its ends to frame member 165 and to a bracket 171 on the body framing D. Additional anchors are not required in this form of the invention because the strut springs are mounted upon the truck side frames at points spaced lengthwise of the truck.

The fifth form of the invention (Figures 19, 20, 21) embodies a two-wheel truck, there being a single pair of strut supporting springs 201 mounted on each end of the truck frame 200. The strut yoke has two upwardly extending legs 203 united at their upper ends to form a relatively wide spring seat 205 mounting a single large diameter spring 207 for carrying the vehicle body framing E. Seat 205 is connected to framing E by a single link 209 extending lengthwise of the vehicle. A single link 211 extending transversely of the truck connects seat 205 with the truck frame. Relative lateral movement of the truck and body framing is controlled by the resistance of spring 207 to lateral distortion. The truck is swiveled to the body framing by longitudinal anchors 213 and 215 and pins 217, as previously described.

The sixth form of the invention (Figures 22, 23, 24) corresponds generally to that shown in Figures 5-10 in having strut supporting springs 221 spaced apart lengthwise of the truck and mounted on the truck frame 223, and in having body carrying springs 225 spaced apart transversely of the truck and seated upon the upper end of the strut 227.

This arrangement is differentiated from those previously described in the use of bellows-like air springs at both ends of the strut yoke, the strut forming a hollow reservoir chamber open to the interior of springs 221 and 225. A pair of aligned central rods 229 and 230 are slidably received in a central opening in the strut and are pivotally connected, respectively, by spherical pivots, to a spring cap 231 and to brackets 233 on the truck frame to limit movement of the ends of the strut laterally and longitudinally of the car relative to the spring cap and truck frame while accommodating deflection of the springs and variation in inclination of the struts. With this arrangement, horizontal and transverse links are dispensed with. The middle portion of the truck and its swiveling to the vehicle body is as previously described for the other forms of the invention and includes anchors as shown at 85, 87 in Figures 5-7.

Each form of the invention attains the general object stated in the introductory portion of the specification. In each instance the body framing is supported directly from the sides of the truck by upright struts which tilt as necessary to accommodate swivel movements of the truck on the body and lateral motion of the truck frame relative to the body. The use of heavy transverse bolster structure with center plate supports and center pin connection to the vehicle body framing is avoided.

The details of the construction may be varied substantially other than as shown without departing from the spirit of the invention and the exclusive use of those modifications coming within the scope of the claims is contemplated.

What is claimed is:

1. A railway vehicle truck comprising axle structures, wheels thereon, truck framing mounted on said axle structures, vertically yielding spring units at each side of the truck intermediate the ends of the truck and supported by the truck framing and spaced apart lengthwise of the truck, an upstanding rigid strut at each side of the truck between the adjacent spaced spring units and having a yoke-like, spring-equalizing base elongated lengthwise of the truck and supported on the adjacent spring units, a vehicle body support at the upper end of each strut comprising vertically yielding spring units, elongated anchor structure extending lengthwise of the truck between the wheels at opposite sides of the truck and pivoted at one end to the truck frame and arranged at its other end for pivotal connection to a vehicle body mounted on the truck to accommodate swiveling of the truck and body while holding the truck and body against relative movement lengthwise of the truck, said vehicle body support spring units also yielding horizontally to accommodate tilting of the struts transversely of the truck frame, and an anchor pivotally connected at one end to the upper end of each strut and extending therefrom transversely of the truck and adapted at its other end for connection to a vehicle body supported by the strut.

2. Railway vehicle truck structure according to claim 1 in which there are links extending lengthwise of the truck at each side of the truck, each link having one end pivotally connected to upper portions of the strut and having its other end arranged for pivotal connection to a vehicle body carried on the body support springs.

3. Railway vehicle truck structure according to claim 1 in which the strut supporting spring units and the strut supported springs are of bellows-type air construction, and each strut is a hollow chamber forming an air reservoir connected to said springs.

4. Railway truck structure according to claim 1 in which each strut comprises an upper part and a lower part disposed end to end with an axially disposed rod inserted into one of the parts and rotatable in the other part, the parts being rotatable on each other about the longitudinal axis of the strut whereby the strut may better accommodate swiveling of the truck relative to a vehicle body carried thereby.

5. Railway truck structure according to claim 4 in which the adjacent ends of the upper and lower portions of the strut form circular discs having wide flat inter-engaging bearing surfaces frictionally resisting their relative rotation and thereby snubbing the swiveling action of the truck relative to the vehicle body.

6. Railway vehicle truck structure according to claim 1 in which the truck supporting spring units at each side of the truck are spaced apart transversely of the truck and the body supporting springs on the upper end of each strut are spaced apart lengthwise of the truck.

7. A railway vehicle truck according to claim 1 in which the truck framing includes a spring plank mounting the spring units at each side of the truck and pivoted on the remainder of the framing to tilt lengthwise of the truck, there being an anchor extending transversely of the truck attached at one end to the spring plank and at its other end to the strut.

8. A railway vehicle truck according to claim 1 which includes spaced axle structures at each side of the truck, the truck framing extending between said axle structures and forming an equalizer for the spring units supported on the framing.

9. Railway vehicle truck structure comprising a wheel and axle supported truck frame, springs seated on said frame and spaced apart lengthwise of the truck at each side of the truck, an upstanding strut at each side of the truck having an elongated base with its ends mounted on said springs, said strut equalizing the action of spring seats on the upper ends of said struts, and vehicle body support springs on said latter mentioned spring seats.

10. Railway vehicle truck structure according to claim 9 in which there are links each pivotally secured at one end to the strut structure and arranged for pivotal connection at its other end to the vehicle body to control the tilting of the strut lengthwise of the truck relative to the vehicle body.

11. Railway vehicle truck structure comprising a wheel and axle structure, a truck frame mounted thereon, an upstanding strut at each side of the truck, a support for the lower end of each strut on the frame, and a support on the upper end of each strut for the side of a vehicle body, said supports providing for tilting of the strut transversely of the strut axis relative to the truck frame and to a vehicle body carried by the strut, the support for each strut including a plurality of vertically yielding springs spaced apart and positioned at opposite sides of the strut axis and yieldingly resisting tilting of the strut in the direction of their spacing.

12. Railway vehicle truck structure comprising a wheel and axle supported frame, an upright strut at each side of the truck, springs seated on the frame and spaced apart lengthwise and transversely of the truck and mounting the lower end of each strut so that the strut may tilt on the frame lengthwise and transversely of the truck, and vehicle body supporting spring means carried by the upper end of each strut.

13. A railway vehicle truck comprising a wheel and axle supported frame having a pair of spring seats at each side of the truck outboard of the corresponding wheel and having a pair of spring seats inboard of the corresponding wheel, the seats of each pair being spaced apart transversely of the wheel axle, a spring seated on each of said seats, an upstanding strut at each side of the truck having a base mounted on each set of four springs at that side of the truck and tiltable on the frame lengthwise and transversely of the truck by the action of said springs, a single relatively large diameter body-supporting spring carried on the upper end of each strut, an elongated link at each side of the truck having one end secured to the truck frame adjacent said strut-supporting spring seats and extending therefrom lengthwise of the truck with its other end arranged for attachment to a vehicle body, and an elongated link at each side of the truck having one end secured to the upper end of the strut and extending therefrom transversely of the truck with its other end arranged for attachment to a vehicle body.

14. Railway vehicle truck structure comprising a wheel and axle supported truck frame, springs at each side of the truck frame spaced apart lengthwise of the truck and mounted on said frame, an upstanding strut structure at each side of the truck with a yoke-like base supported on the adjacent springs at points spaced apart lengthwise of the truck, said springs yielding to accommodate inclination of the strut transversely of the strut axis both lengthwise and transversely of the truck, and a support on the upper end of each strut for the side of a vehicle body.

15. Railway vehicle truck structure comprising a wheel and axle supported truck frame, spring units seated on said frame at the sides of the truck, upstanding struts mounted on said springs, and vehicle body support spring units on the upper ends of said struts, at least one of said spring units at each side of the truck comprising a pair of springs spaced apart transversely of the truck.

16. A railway vehicle truck comprising wheeled axle structure, truck framing mounted on said structure outboard of the wheels, springs with upright axes mouted on said framing outboard of the wheels and abreast of the center of the truck, a rigid upstanding strut carried by the springs at each side of the truck and tiltable lengthwise of the truck by the distortion of said springs, vehicle body supports on the upper ends of said struts, and an elongated anchor connected at one end to the upper portion of each strut and arranged at its opposite end for connection to a vehicle body mounted on said supports to limit the tilting movement of the strut.

References Cited in the file of this patent

UNITED STATES PATENTS

| | | |
|---|---|---|
| 603,305 | Austin | June 7, 1898 |
| 2,141,592 | Clar et al. | Dec. 27, 1938 |
| 2,225,242 | Van Dorn et al. | Dec. 17, 1940 |
| 2,268,267 | Sheesley | Dec. 30, 1941 |
| 2,614,508 | Archambault | Oct. 21, 1952 |
| 2,687,099 | MacVeigh | Aug. 24, 1954 |
| 2,756,691 | Masel et al. | July 31, 1956 |

FOREIGN PATENTS

| | | |
|---|---|---|
| 157,620 | Australia | July 13, 1954 |